United States Patent Office 3,849,568
Patented Nov. 19, 1974

3,849,568
ANTIMYCOTIC BENZISOTHIAZOLINE DERIVATIVES
Horst Boshagen, Haan, and Manfred Plempel, Wuppertal-Elberfeld, Germany, assignors to Bayer Aktiengesellschaft
No Drawing. Application June 10, 1971, Ser. No. 151,929, which is a continuation-in-part of abandoned applications Ser. No. 566,199, July 19, 1966, and Ser. No. 783,756, Dec. 13, 1968. Divided and this application July 12, 1973, Ser. No. 378,520
Claims priority, application Germany, July 29, 1965, F 46,742
Int. Cl. A61k 27/00
U.S. Cl. 424—270    30 Claims

ABSTRACT OF THE DISCLOSURE

The weakly basic products obtained from the reaction of an N-substituted-3-halogenobenzisothiazolium halogenide and ammonia, and the salts of these products with strong acids, possess antimycotic properties. The substituents on the nitrogen atom of the 3-halogenoisothiazolium halogenide can be an alkyl group of 1 to 7 carbon atoms, benzyl, cyclohexyl, methylcyclohexyl, phenyl or phenyl substituted by halogen, nitro, lower alkyl, nitro, lower alkyl, lower alkoxy or di-(lower alkyl) amino. A typical embodiment is the hydrochloride salt of the product obtained from 2-methyl-3-chlorobenzisothiazolium chloride and ammonia, said hydrochloride being colorless prisms and having the empirical formula $C_8H_8NS \cdot HCl$ with a melting point of 220° C.

CROSS REFERENCE

This is a divisional of Ser. No. 151,929, filed June 10, 1971 which in turn is a continuation-in-part of Ser. No. 566,199, filed July 19, 1966 and Ser. No. 783,756, filed Dec. 13, 1968, both now abandoned, Ser. No. 783,756 itself being a continuation-in-part of Ser. No. 566,199.

DETAILED DESCRIPTION

The present invention pertains to new antimycotic agents of reduced toxicity and improved skin compatibility.

In particular, the present invention pertains to the weakly basic products obtained upon the treatment of an N-substituted-3-halogenbenzisothiazolium halogenide of the formula:

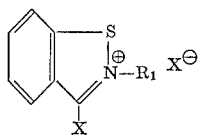

I where $R_1$ is an alkyl group of 1 to 7 carbon atoms, chloroalkyl of 1 to 7 carbon atoms, benzyl, cyclohexyl, methylcyclohexyl, phenyl or phenyl substituted by halogen, nitro, lower alkyl, lower alkoxy or di(lower alkyl) amino, and X is chloro or bromo, with ammonia.

The present invention also pertains to the salts of these weakly basic products with strong acids.

By the term "lower alkyl" is meant a branched or straight chain hydrocarbon groups of from 1 to 4 carbon atoms such as methyl, ethyl, propyl, isopropyl, butyl, sec.-butyl and tert.-butyl. The term "lower" alkoxy refers to a similar hydrocarbon group which is bound to the remainder of the molecule by an oxygen atom.

A preferred group of compounds are those wherein $R_1$ is alkyl of 1 to 4 carbon atoms, β-chloroethyl, benzyl, cyclohexyl, methylcyclohexyl, phenyl or methylphenyl.

The reaction products, on a molar basis, include not only one mole of the novel products but also two moles of HX, the N-substituted-3-halogenobenzisothiazolium halogenide yielding two moles of halide ion and the ammonia yielding two moles of hydrogen ion.

The products are obtained by introducing an N-substituted-3-halogenobenzisothiazolium halogenide into an excess of ammonia. Generally this introduction is performed at a temperature of from about 5° to 10° with the ammonia being in a solution of, for example, methanol. Thus for example, the product is formed by adding one molecular equivalent of an N-substituted-3-halogenobenzisothiazolium halogenide to one liter of 5M ammonia in methanol at from 5° to 10° C. The hydrogen chloride generated combines with excess ammonia and precipitates as ammonium chloride. The product can be readily obtained by concentration, either of the reaction mixture containing the free base or with prior conversion to a salt through treatment with a strong acid. The products and their salts, after suitable purification such as through crystallization, are colorless crystalline materials. Suitable strong acids include naphthalene disulfonic acid, nitric acid, hydrochloric acid, hydrobromic acid, hydroiodic acid and the like.

The N-substituted-3-halogenobenzisothiazolium halogenides employed as starting materials are prepared from N-substituted dithiosalicyclic acids and phosphorous pentahalides according to known methods (Chem. Ber 99, 2566).

On the basis of the information presently available, it is believed the structure of the weakly basic product obtained according to this procedure can be diagrammatically depicted as:

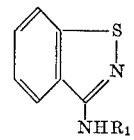

II in which $R_1$ is defined above.

When salts of these products are held in a fluid state, either by dissolution or melting, an equilibrium is established between the compounds of the present invention and 2-substituted-3-iminobenzisothiazoline salt. This equilibrium can be represented as follows:

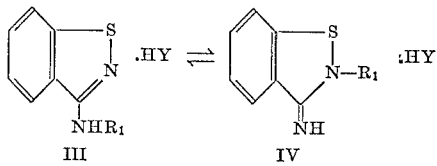

III             IV

The imino form IV can be isolated in solid form as its salt from such an equilibrium mixture by removing unchanged amino starting material, as by nitrosation in an acidic solution, and thereafter recovering the imino salt. When either form is placed in a fluid state however, the above equilibrium occurs. In aqueous media this equilibrium is in the range of 40:60 to 60:40 amino:imino. Use of other solvents such as dimethylsulfoxide results in an equilibrium of 90:10 amino:imino.

The compounds obtained upon the treatment of an N-substituted - 3 - halogenobenzisothiazolium halogenide and ammonia, and the salt thereof with strong acids, exhibit antimycotic properties and are useful in human and veterinary medicine. Thus these compounds demonstrate excellent inhibition against Trichophyton mentagrophytes, Candida albicans, Penicillium commune, Aspergillus niger and *Microsporium felineum*. They can be administered in conventional topical pharmaceutical formulations such as sprays, powders, creams and ointments which are prepared by techniques known per se. Particularly useful compositions are those in solution form. Suitable solvents include polar solvents or mixtures thereof such as dimethylsulfoxide, dimethylformamide; aliphatic primary alcohols of up to 6 carbon atoms, glycols having up to 3 hydroxyl groups such as glycerine, ethylene glycol and propylene glycol and etherized poly alcohols such as polyethylene glycol, as well as any of the preceding in admixtures with water, hydroxylated castor oil, fatty acid-condensation products of polyethylene glycols and the like.

The following examples will serve to further typify the nature of the present invention without their being a limitation of the scope thereof.

EXAMPLE 1

110 g. (0.5 mole) of 2 - methyl - 3 - chloro - benzisothiazolium chloride (finely powdered) are introduced portionwise at 5° to 10° C. into 500 ml. of a saturated solution of $NH_3$ in methanol (2.5 moles) while stirring vigorously. Stirring is continued for another 5 minutes in order to complete the reaction, the precipitated ammonium chloride is then filtered off with suction and the filtrate is evaporated *in vacuo*. The resultant syrup is taken up in 150 ml. of 1:1 hydrochloric acid (0.75 mole). The initially clear solution solidifies to a solid pulp after a few minutes. After standing in an ice bath for some time (30 minutes), the hydrochloride which has crystallized out is filtered off with suction, washed with a little cold water and dried. 55 g. of product as hydrochloride salt are obtained which, after crystallization from ethanol; appear as colorless prisms of melting point 220° C. (sublim.). The yield represents 55% of quantitative for 3-methylaminobenzisothiazole.

EXAMPLE 2

In a similar fashion to that described in Example 1, colorless, well defined leafy prisms of melting point 171° C. (sublim.), corresponding to 3 - ethylaminobenzisothiazole hydrochloride, are obtained from 2-ethyl-3-chlorobenzisothiazolium chloride.

EXAMPLE 3

In a similar fashion to that described in Example 1, colorless, compact, well defined prisms of the product, corresponding to 3 - (β - chloroethylamino) - benzisothiazole hydrochloride, are obtained through utilization of 2 - (β - chloroethyl) - 3 - chlorobenzisothiazolium chloride and demonstrate a melting point of 152° C. after crystallization from methanol.

EXAMPLE 4

By heating a solution of the hydrochloride salt of the above products in water for a period of about 24 hours, and thereafter isolating the non-amino product through removal of any unchanged amino salt, the corresponding imino hydrochloride salts are obtained, i.e., 2-methyl-3-imino - 1,2 - benzisothiazoline hydrochloride, melting point 232° C. (dec.); 2 - ethyl - 3 - imino - 1,2 - benzisothiazoline hydrochloride, melting point 169° C.; and 2-(β - chloroethyl) - 3 - imino - 1,2 - benzisothiazoline hydrochloride melting point 165–166° C. (dec.).

EXAMPLE 5

By treating 2 - propyl - 3 - chlorobenzisothiazolium chloride with ammonia according to the procedure of Example 1, the product, corresponding to 3 - propylaminobenzisothiazole hydrochloride, having a melting point of 111° C. is obtained.

EXAMPLE 6

By treating 2 - butyl - 3 - chlorobenzisothiazolium chloride with ammonia according to the procedure of Example 1, the product, corresponding to 3-butylaminobenzisothiazole hydrochloride, is obtained in the form of colorless, compact prisms after crystallization from acetonitrile which melt at 155–157° C., crystallize and exhibit a second melting point at 212° C.

EXAMPLE 7

Upon treating 2 - isobutyl - 3 - chlorobenzisothiazolium chloride with ammonia according to the procedure of Example 1, the product, corresponding to 3-isobutylamino benzisothiazole hydrochloride, is obtained in the form of large colorless plates after crystallization from methanol, which melts at 187° C., crystallizes and exhibits a second melting point at 216° C.

EXAMPLE 8

By treating 2 - cyclohexyl - 3 - chloro - benzisothiazolium chloride with ammonia, a product, 3 - cyclohexylaminobenzisothiazole hydrochloride, is obtained as colorless, compact prisms of melting point 166° C.

Similarly by utilizing 2 - (4 - methylcyclohexyl) - 3-chlorobenzisothiazolium chloride, a product, 3-(4-methylcyclohexylamino) - benzisothiazole hydrochloride, is obtained which after crystallization from ethoxyethanol is in the form of colorless crystals having a melting point of 160° C.

Similarly by utilizing 2 - (3 - methylcyclohexyl) - 3-chlorobenzisothiazolium chloride, a product, 3 - (3-methylcyclohexylamino) - benzisothiazole hydrochloride, is obtained after crystallization from ethanol as colorless small needles of melting point 197° C.

Similarly by utilizing 2 - (2 - methylcyclohexyl) - 3-chlorobenzisothiazolium chloride, a product, 3 - (2-methylcyclohexylamino) - benzisothiazole hydrochloride, is obtained as colorless prisms of melting point 210° C. after crystallization from dimethylsulfoxide.

EXAMPLE 9

By treating 2 - benzyl - 3 - chloro - benzisothiazolium chloride with ammonia, a product, 3 - benzylaminobenzisothiazole, is isolated in the form of the free base as colorless, compact prisms having a melting point of 85° C. after crystallization from methanol.

EXAMPLE 10

By treating 2 - phenyl - 3 - chlorobenzisothiazolium chloride with ammonia according to the procedure of Example 1, a product, 3 - phenylaminobenzisothiazole, is isolated in the form of the free base as colorless, bulbous crystals having melting point of 99° C. after crystallization from ethanol.

EXAMPLE 11

Upon treating 2 - (4 - methylphenyl) - 3 - chlorobenzisothiazolium chloride with ammonia according to the procedure of Example 1, a product, 3 - (4 - methylphenylamino) - benzisothiazole, is obtained as a free base as long yellowish needles of melting point 144° C. after crystallization from ethanol.

EXAMPLE 12

In solution, an equilibrium occurs between the salts of the 3-substituted aminobenzisothiazole, exemplified by Examples 1–3 and 5–10, and the salts of 3-amino-2-substituted benzisothiazoline salt, exemplified by Example 4, the proportions generally being in the range of 40:60 to 60:40, respectively. When dimethylsulfoxide is employed as the sole solvent, the ratio is generally 90:10 amino salt:imino salt. Such equilibrium mixtures, which demonstrate undiminished antimycotic activity, are typified by the following compositions, utilizing the product of Example 2 as its hydrochloride salt as the active ingredient whereby some of the corresponding 2-ethyl-3-amino-1,2-benzisothiazoline hydrochloride is formed when the composition has stood at 20° C. for a period of 10 days after preparation:

(A) A 1% solution for veterinary medical purposes from the product of Example 2 has been prepared as follows:

| | G. |
|---|---|
| The hydrochloride of the product of Example 2 | 12.04 |
| Dimethylsulfoxide | 100.0 |
| Isopropanol | 100.0 |
| Glycerine | 300.0 |
| Demineralized water (1=liter=1000 cc.), ad. 1, 1.000. | |
| | 1061. |

The ratio of the amino form to the imino form amounts to 40:60%, determined by high voltage paper electrophoresis.

(B) A 1% solution of:

| | G. |
|---|---|
| The hydrochloride of the product of Example 2 | 12.04 |
| Glycerine | 300.0 |
| Ethanol (96 vol. percent) | 300.0 |
| n/10-aqueous sodium hydroxide added up to pH=3.5 | 40.0 |
| Distilled water, ad. 1, 1.000. | |
| | 1016. |

The ratio of the amino form to the imino form amounts to 85:15%, determined by high voltage paper electrophoresis.

(C) A 10% solution for veterinary medical purposes:

| | G. |
|---|---|
| The hydrochloride of the product of Example 2 | 120.4 |
| Glycerine | 500.0 |
| Dimethylsulfoxide, ad. 1, 1.000. | |
| | 1182. |

The ratio of the amino form to the imino form amounts to 45:55%, determined by high voltage paper electrophoresis. In the following the letters T, Ar, Eu and Em have the following meaning:

T=polyoxyethylene sorbitan monostearate named Tween 60 (trademark of Atlas Powder Corporation, Wilmington, USA);
Ar=sorbitane monostearate named Arlacel 60 (trademark of Atlas Powder Corporation, Wilmington, USA);
Eu=a octyldodecanol named Eutanol G (trademark of Deutsche Hydrierwerke AG, Duisburg, Germany);
Em=an emulsifier on the basis of a mixture of mono- and diglycerides of higher saturated fatty acids (palmitic and stearic acid) named Emulsan MD (trademark of Deutsche Hydrierwerke AG, Duisburg, Germany);

(D) A 1% ointment consisting of:

| | G. |
|---|---|
| The hydrochloride of the product of Example 2 | 12.04 |
| T 60 | 30.0 |
| Ar 60 | 20.0 |
| Eu C | 100.0 |
| Em Md | 200.0 |
| Dimethylsulfoxide | 200.0 |
| Demineralized water, ad | 1000.0 |

The ratio of the amino form to the imino form amounts to 55:45%, determined by high voltage paper electrophoresis.

(E) A 1% ointment consisting of:

| | G. |
|---|---|
| The hydrochloride of the product of Example 2 | 12.04 |
| T 60 | 30.0 |
| Ar 60 | 20.0 |
| Eu G | 100.0 |
| Em MD | 150.0 |
| Dimethylsulfoxide | 200.0 |
| Demineralized water, ad | 1000.0 |

The ratio of the amino form to the imino form amounts to 50:50%, determined by ultra-violet spectroscopy.

(F) A 0.5% ointment consisting of:

| | G. |
|---|---|
| The hydrochloride of the product of Example 2 | 6.02 |
| T 60 | 30.0 |
| Ar 60 | 20.0 |
| Eu G | 100.0 |
| Em MD | 150.0 |
| Dimethylsulfoxide | 200.0 |
| Demineralized water, ad | 1000.0 |

The ratio of the amino form to the imino form amounts to 45:55%, determined by ultra-violet spectroscopy.

What is claimed is:

1. An antimycotic composition comprising a pharmaceutical carrier in combination with an antimycotically effective amount of a compound selected from the group consisting of (a) a benzisothiazole of the formula:

wherein $R_1$ is alkyl of form 1 to 7 carbon atoms, chloroalkyl of 1 to 7 carbon atoms, benzyl, cyclohexyl, methylcyclohexyl, phenyl or phenyl substituted by halogen, nitro, lower alkyl, lower alkoxy or di(lower alkyl) amino and (b) a salt thereof with a strong acid.

2. A composition according to claim 1, wherein $R_1$ is alkyl of 1 to 4 carbon atoms, β-chloroethyl, benzyl, cyclohexyl, methylcyclohexyl, phenyl or methylphenyl.

3. A composition according to claim 1 wherein said compound is selected from the group consisting of 3-methylamino-benzisothiazole and the hydrochloride salt thereof.

4. A composition according to claim 1 wherein said compound is selected from the group consisting of 3-ethylamino-benzisothiazole and the hydrochloride salt thereof.

5. A composition according to claim 1 wherein said compound is selected from the group consisting of 3-propylaminobenzisothiazole and the hydrochloride salt thereof.

6. A composition according to claim 1 wherein said compound is selected from the group consisting of 3-butylaminobenzisothiazole and the hydrochloride salt thereof.

7. A composition according to claim 1 wherein said compound is selected from the group consisting of 3-isobutylaminobenzisothiazole and the hydrochloride salt thereof.

8. A composition according to claim 1 wherein said compound is selected from the group consisting of 3-(β-chloroethylamino)-benzisothiazole and the hydrochloride salt thereof.

9. A composition according to claim 1 wherein said compound is selected from the group consisting of 3-cyclohexylaminobenzisothiazole and the hydrochloride salt thereof.

10. A composition according to claim 1 wherein said compound is selected from the group consisting of 3-(4-methylcyclohexylamino)-benzisothiazole and the hydrochloride salt thereof.

11. A composition according to claim 1 wherein said compound is selected from the group consisting of 3-(3-methylcyclohexylamino)-benzisothiazole and the hydrochloride salt thereof.

12. A composition according to claim 1 wherein said compound is selected from the group consisting of 3-(2-methylcyclohexylamino)-benzisothiazole and the hydrochloride salt thereof.

13. A composition according to claim 1 wherein said compound is selected from the group consisting of 3-benzylaminobenzisothiazole and the hydrochloride salt thereof.

14. A composition according to claim 1 wherein said compound is selected from the group consisting of 3-phenylaminobenzisothiazole and the hydrochloride salt thereof.

15. A composition according to claim 1 wherein said compound is selected from the group consisting of 3-(4-methylphenylamino)-benzisothiazole and the hydrochloride salt thereof.

16. A method of combatting antimycotic infections in humans and animals which comprises topically applying an antimycotically effective amount of a compound selected from the group consisting of (a) a benzisothiazole of the formula:

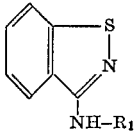

wherein $R_1$ is alkyl of from 1 to 7 carbon atoms, chloroalkyl of 1 to 7 carbon atoms, benzyl, cyclohexyl, methylcyclohexyl, phenyl or phenyl substituted by halogen, nitro, lower alkyl, lower alkoxy or di(lower alkyl) amino and (b) a salt thereof with a strong acid, to the infected area on said human or animal.

17. A method according to claim 16 wherein $R_1$ is alkyl of 1 to 4 carbon atoms, β-chloroethyl, benzyl, cyclohexyl, methylcyclohexyl, phenyl or methylphenyl.

18. A method according to claim 16 wherein said compound is selected from the group consisting of 3-methylaminobenzisothiazole and the hydrochloride salt thereof.

19. A method according to claim 16 wherein said compound is selected from the group consisting of 3-ethylaminobenzisothiazole and the hydrochloride salt thereof.

20. A method according to claim 16 wherein said compound is selected from the group consisting of 3-propylaminobenzisothiazole and the hydrochloride salt thereof.

21. A method according to claim 16 wherein said compound is selected from the group consisting of 3-butylaminobenzisothiazole and the hydrochloride salt thereof.

22. A method according to claim 16 wherein said compound is selected from the group consisting of 3-isobutylaminobenzisothiazole and the hydrochloride salt thereof.

23. A method according to claim 16 wherein said compound is selected from the group consisting of 3-(β-chloroethylamino)-benzisothiazole and the hydrochloride salt thereof.

24. A method according to claim 16 wherein said compound is selected from the group consisting of 3-cyclohexylaminobenzisothiazole and the hydrochloride salt thereof.

25. A method according to claim 16 wherein said compound is selected from the group consisting of 3-(4-methylcyclohexylamino)-benzisothiazole and the hydrochloride salt thereof.

26. A method according to claim 16 where said compound is selected from the group consisting of 3-(3-methylcyclohexylamino)-benzisothiazole and the hydrochloride salt thereof.

27. A method according to claim 16 wherein said compound is selected from the group consisting of 3-(2-methylcyclohexylamino)-benzisothiazole and the hydrochloride salt thereof.

28. A method according to claim 16 wherein said compound is selected from the group consisting of 3-benzylaminobenzisothiazole and the hydrochloride salt thereof.

29. A method according to claim 16 wherein said compound is selected from the group consisting of 3-phenylaminobenzisothiazole and the hydrochloride salt thereof.

30. A method according to claim 16 wherein said compound is selected from the group consisting of 3-(4-methylphenylamino)-benzisothiazole and the hydrochloride salt thereof.

References Cited

UNITED STATES PATENTS 3,187,001   6/1965   Meyer et al. _____ 260—304

OTHER REFERENCES

Boshagen, *Berichte, 99,* August 1966, pp. 2566–71.

JEROME B. GOLDBERG, Primary Examiner